United States Patent [19]
Topham et al.

[11] Patent Number: 6,030,598
[45] Date of Patent: Feb. 29, 2000

[54] PROCESS FOR PRODUCING A GASEOUS PRODUCT

[75] Inventors: Anthony K. J. Topham, Walton-on-Thames; Rodney J. Allam, Guildford, both of United Kingdom

[73] Assignee: Air Products and Chemicals, Inc., Allentown, Pa.

[21] Appl. No.: 09/093,209

[22] Filed: Jun. 8, 1998

[30] Foreign Application Priority Data

Jun. 11, 1997 [DE] Germany ................................ 9712165

[51] Int. Cl.7 ............................ B01D 53/02; B01D 53/04; C01B 13/10
[52] U.S. Cl. ................................ 423/581; 95/90; 95/116; 95/138; 423/659
[58] Field of Search ................................ 95/138, 90, 116; 423/659, 581

[56] References Cited

U.S. PATENT DOCUMENTS

| 2,872,397 | 2/1959 | Kiffer | 204/176 |
| 4,136,027 | 1/1979 | Sakamoto et al. | 210/63 |
| 4,280,824 | 7/1981 | Lassmann et al. | 55/26 |
| 4,371,380 | 2/1983 | Benkmann | 55/26 |
| 4,604,279 | 8/1986 | Leitzke et al. | 423/581 |
| 4,786,489 | 11/1988 | Grenier et al. | 423/581 |
| 4,863,497 | 9/1989 | Grenier et al. | 55/181 |
| 5,507,957 | 4/1996 | Garrett et al. | 210/760 |
| 5,520,887 | 5/1996 | Shimizu et al. | 422/186.08 |
| 5,810,910 | 9/1998 | Ludwig et al. | 95/138 |
| 5,846,298 | 12/1998 | Weist, Jr. | 95/138 |

FOREIGN PATENT DOCUMENTS

| 658719 | 3/1992 | Australia | C01B 13/10 |
| 61-306348 | 12/1986 | Japan | C01B 13/10 |
| 3-16638 | 1/1991 | Japan | B01J 02/18 |

OTHER PUBLICATIONS

Homer, G., "An Integrated System for the Production of Oxygen and Ozone for Pulp Mill Use", *CPPA Technical Section Pacific and Western Branches Jasper Conference*, May 14–16, 1992.

Uhlig, G., "Closed–Loop System for Generating Ozone from Oxygen and its Application to the Treatment of Drinking Water at Duesburg, Federal Republic of Germany", Chapter 9, *Handbook of Ozone Technology and Applications*, vol. 2 (Ed. Rip G. Rice—An. Abor. Science), (no date).

Cook et al., "Separation of Ozone from Oxygen by a Sorption Process", *Advances in Chemistry Series*, (no date).

Johnson et al., "Oxygen/Ozone Supply and Integration Economics", 79$^{th}$ Annual Meeting, Technical Section, CPPA, (no date).

"Separation and Enrichment by Pressure Swing Adsorption Process", Linde Presentation at Ozone Seminar, Helsinki, May 12, 1992.

"Liquid Air OZONEOX", Pamphlet, 1992, (no month).

*Primary Examiner*—Wayne Langel
*Attorney, Agent, or Firm*—John M. Fernbacher

[57] ABSTRACT

An ozone containing gas stream is produced from oxygen by subjecting oxygen to an electric discharge and the ozone is then adsorbed on to a solid adsorbent, such as zeolite, the oxygen containing stream leaving the adsorbent is recycled to the ozonising process. Periodically, oxygen adsorbed on the adsorbent is desorbed by co-currently passing a purge gas over the adsorbent and the desorbed oxygen is also recycled to the ozoniser. Lastly ozone is desorbed from the adsorbent by a counter-current flow of purge gas and used in an ozone demanding process.

14 Claims, 3 Drawing Sheets

| | | | | | | |
|---|---|---|---|---|---|---|
| C1 | FEED O2/O3 PRODUCE O2 PRODUCT | CO CURRENT PURGE O2 | PRODUCE PRODUCT O3(I) | PRODUCE PRODUCT O3(II) | PRODUCE PRODUCT O3(III) | HOLD | FEED O2/O3 |
| C2 | PRODUCE PRODUCT O3(I) | PRODUCE PRODUCT O3(II) | HOLD | FEED O2/O3 | FEED O2/O3 PRODUCE O2 PRODUCT | FEED O2/O3 PRODUCE O2 PRODUCT | CO CURRENT PURGE O2 |
| C3 | HOLD | FEED O2/O3 | FEED O2/O3 PRODUCE O2 PRODUCT | CO CURRENT PURGE O2 | PRODUCE PRODUCT O3(I) | PRODUCE PRODUCT O3(II) | PRODUCE PRODUCT O3(III) |

FIG. 3

PROCESS FOR PRODUCING A GASEOUS PRODUCT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to methods and apparatus for use in the production of a gas stream containing a product gas from a reactant gas, e.g. the production of an ozone containing gas stream from oxygen.

Ozone is produced industrially for use for a number of purposes. These include disinfection, e.g. of drinking water, and a number of chemical reactions. As ozone is unstable and decays back to oxygen, it must be made immediately prior to its use. This is conventionally done in an ozoniser in which either air or oxygen is subjected to a silent electric discharge. It is known that the efficiency of the ozone generation depends upon the oxygen concentration in the gas subjected to this process and rises with increasing oxygen concentration. At higher ozone concentrations, the specific power required for ozone generation from oxygen may be lower than 10 percent of that required using air.

However, a disadvantage of the use of oxygen is the cost of separating oxygen from air. Only a low overall conversion of oxygen to ozone is achieved in the ozoniser, typically from 5 to 15 wt % so that large amounts of oxygen will be wasted if there is no use for the oxygen enriched gas downstream of the ozone contacting process in which the ozone is used. Various attempts have been made in the past to limit this oxygen wastage.

A technique known as long-loop recycling is well known in the literature and is described in the "Handbook of Ozone Technology and Applications" Vol. 2 (Ed. Rip G. Rice—An. Abor. Science). In this technique, an oxygen-rich gas supplied either from the liquid oxygen tank or as the output of an air separation unit is subjected to the production of ozone in an ozoniser. The oxygen-rich ozone containing gas is then used in the ozone consuming process such as water treatment. Residual ozone in the off-gas from this process is then destroyed leaving an oxygen-rich vent gas contaminated by chemical species picked up in the ozone consuming process. These will typically include water and nitrogen as well as hydrocarbons but will depend upon the nature of the ozone consuming process. These contaminants must be removed from the oxygen-rich stream in a drying and clean-up stage prior to the oxygen being recycled into the system upstream of the ozoniser or they will upset the operation of the ozoniser.

This process is disadvantageous in that the purification of the oxygen-rich vent stream poses a complex problem. The nature of amount of all of the different contaminants which may be present is not necessarily known and, if known, is likely to be unique to the particular process conditions used so that the drying and clean-up stage must be customised to deal with each unique situation. There is a continuing risk that the recycled oxygen-rich stream may carry moisture into the ozone generator and this will cause power inefficiencies in the generator and eventual permanent damage. Where the process is one of water treatment, the ozone contacting process will result in large amounts of nitrogen being stripped out of the water stream by the oxygen/ozone mixture which will increase the load on the recycling system which must remove hydrocarbons, water and nitrogen and other inert gases to bring the oxygen concentration to feed gas purity. Failure to achieve this level of purity will affect the power consumption of the ozone generator.

Although the bulk of the oxygen can be recovered, there are significant oxygen losses in the clean-up and drying processes.

An alternative recycling process known as short-loop recycling is described in U.S. Pat. No. 2,872,397 (Kiffer) and with variations in numerous other publications. In this type of system oxygen is supplied as before to an ozoniser to form an oxygen-rich ozone containing stream. Before the ozone consuming process however the oxygen is separated from this stream and recycled back upstream of the ozoniser. The ozone is transferred to another gas stream such as air. The ozone containing gas is then led to the ozone consuming process. Off-gas from that is subjected to the destruction of residual ozone and may then be vented.

The mechanism for separating the oxygen from the ozone is typically the use of a PSA (pressure swing adsorbent) system in which the oxygen/ozone mixture is passed through a solid adsorbent which retains the ozone and passes the oxygen. When the adsorbent bed becomes sufficiently saturated, a dry inert gas, typically a nitrogen-rich stream from the air separation unit, is passed counter-current to the oxygen flow through the bed to desorb the ozone from the adsorbent and to produce a nitrogen-rich ozone containing stream which is fed to the ozone consuming process. An oxygen-rich stream is then used to displace the nitrogen from the bed before the bed goes back on-line to adsorb ozone. The use of three beds allows these steps to be conducted cyclicly on each bed with one bed being on-stream at all times.

In U.S. Pat. No. 2,872,397, at the end of the on-line period oxygen is exhausted from the void volume of the bed by using a vacuum system to reduce the pressure in the bed and this evacuated low pressure gas is recovered and recompressed for recycling into the system. This of course involves a power consumption cost. If it is not done, all of the oxygen co-absorbed with the ozone in the bed and the void volume of oxygen in the bed is lost from the system when the cycle is switched to the desorption of ozone from the bed using a nitrogen-rich stream. This switch loss of oxygen significantly reduces the oxygen recovery in the cycle. It also passes oxygen into the ozone consuming process which may or may not be acceptable depending upon the nature of that process. A similar system is described in U.S. Pat. No. 4,136,027 (Sakamoto et al). The process uses adsorbent preferably silica gel operating preferably at low temperature. The process needs a source of refrigeration and a heat exchange system for cooling feed against product streams. Apart from this complexity the process suffers from potential safety problems because the high adsorption capacity of silica gel for ozone at low temperature. Maloperation can cause desorbtion of ozone at concentrations high enough for explosions to occur.

U.S. Pat. No. 4,371,380 (Benkmann) illustrates the use of this type of system in a context other than ozone generation. Here, oxygen is passed from an air separation unit to a fermenter in which it becomes loaded with $CO_2$ which needs to be removed so that the oxygen can be recycled into the fermenter. This is carried out in a PSA system in which the carbon dioxide is adsorbed and periodically removed from the adsorbent using a flow of nitrogen from the air separation unit.

In U.S. Pat. No. 4,280,824 (Lassmann et al) the nitrogen-rich gas used for desorbing the ozone is air and the adsorbent contains activated alumina for adsorbing water vapour from the air, silica gel for adsorbing the ozone as well as carbon dioxide contained in the air and molecular sieve for adsorbing nitrogen. Accordingly, this system combines the separation of air into nitrogen and oxygen with the recycling of the oxygen using the same adsorbent beds.

Whereas in U.S. Pat. No. 2,872,397, the adsorbent was cleared of nitrogen by introducing oxygen counter-current to the normal adsorption flow direction, in U.S. Pat. No. 4,786,489 (Grenier) the oxygen is used to flush nitrogen out of the adsorbent beds in the co-current direction with respect to the adsorption flow.

JP-63-159202 (Mitsubishi Heavy Industries) contains a disclosure similar to that of U.S. Pat. No. 2,872,397 but operates the ozone recovery in a refrigerated space.

The disclosure of U.S. Pat. No. 4,863,497 is similar to that of U.S. Pat. No. 4,786,489 except that it also discloses a radial flow adsorbent bed apparatus for conducting the method.

U.S. Pat. No. 5,507,957 (Garrett et al) discloses a method of this general type in which the ozonised oxygen is directed back to the PSA air separation unit in which the oxygen was produced and the ozone is adsorbed in a bed of silica gel from which it is desorbed by nitrogen flowing out of the air separation unit. This is similar to the method employed in U.S. Pat. No. 4,280,824.

There are numerous other prior art teachings essentially cumulative with those discussed above.

All of these short-loop recycling methods suffer from the disadvantages discussed at the outset.

BRIEF SUMMARY OF THE INVENTION

The present invention now provides a method for the production of a gas stream containing a product gas comprising:

a) subjecting a stream of a reactant gas to a product gas producing process to form a reactant gas and product gas containing stream;

b) adsorbing said product gas from said reactant gas and product gas containing stream in a bed of adsorbent so as to produce a reactant gas containing and product gas depleted stream;

c) displacing reactant gas from said bed by passing through the bed a stream of purge gas;

d) recycling said reactant gas containing and product gas depleted stream and said displaced reactant gas into the product gas producing process;

e) removing the product gas from said bed in a flow of said purge gas to produce said gas stream containing a product gas, thereby regenerating said adsorbent for product gas adsorption; and repeating steps (b) to (e) in a cyclic manner.

Preferably, a further step (f) is included and is repeated in which purge gas left in said bed following step (e) is removed from said bed and is not passed into the product gas producing process. The purge gas removed from the bed in step (f) may advantageously be added to said gas stream containing a product gas. In step (f) said purge gas may be removed from said bed by the passage into the bed of said reactant gas and product gas containing stream at the start of step (b).

Whilst the method according to the invention is in principle applicable to the production of gas streams containing a wide variety of product gases, it is of particular importance in the production of ozone and accordingly it is preferred that the reactant is oxygen. It is preferred that the product gas is ozone and it is preferred that the purge is a nitrogen-rich gas which is preferably sufficiently dry that will not interfere with the efficiency or operational lifetime of an ozoniser.

As applied to the production of a gas stream containing ozone therefore, the invention provides a method of producing a gas stream containing ozone comprising:

a) subjecting a stream of oxygen-containing gas to an ozone producing process to form an oxygen and ozone-containing stream;

b) adsorbing ozone from said oxygen and ozone-containing stream in a bed of adsorbent so as to produce an oxygen-containing ozone depleted stream;

c) displacing oxygen from said bed by passing through the bed a stream of nitrogen-rich gas;

d) recycling said oxygen-containing ozone depleted stream and said displaced oxygen into the ozone producing process;

e) removing ozone from said bed in a flow of nitrogen-rich gas to produce said gas stream containing ozone, thereby regenerating said adsorbent for ozone adsorption and leaving said bed occupied by said nitrogen rich gas;

f) removing nitrogen left in said bed following step (e) such that said nitrogen removed from said bed is not passed into said ozone generating process; and repeating steps (b) to (f) in a cyclic manner.

Said nitrogen removed from the bed in step (f) may be added to said gas stream containing ozone. In step (f), said nitrogen may be removed from said bed by the passage into the bed of said oxygen and ozone containing gas at the start of step (b).

It is preferred that the flow of nitrogen-rich gas in step (c) which serves to displace reactant gas (oxygen) from the bed into the recycling system is in the same direction through the bed as the flow of the oxygen and ozone-containing stream in step (b) and that the flow of nitrogen-rich gas which removes ozone from the bed in step (b) is in the opposite direction.

Typically of course the method will be practised using a plurality of adsorbent beds subjected to the cyclic steps so phased that at least one bed is undergoing step (b) or step (c) at any time. The cycle lends itself to the use of three beds or a multiple of three beds.

It is preferred that between step (e) and step (b), the or each bed undergoes a period when it is off-line and is not participating in any of the recited steps.

It will be noted that the method operates through changes in partial pressure of the various gas components passing through the adsorbent bed and may therefore be viewed as a pressure swing adsorption system but that it is not necessary that there by any significant changes in total gas pressure within the adsorbent bed. If desired however, the system can be operated in a more conventional swing adsorption mode in which the total pressure over the adsorbent is changed as known in the art.

The invention includes apparatus for use in the method which apparatus comprises means for producing a reactant gas; means for subjecting a stream of said reactant gas to a product gas producing process to form a reactant gas and a product gas containing stream; at least one vessel containing an adsorbent connected to receive said reactant gas and product gas containing stream to allow adsorption of said product gas in said adsorbent and having an outlet for a reactant gas containing and product gas depleted stream; means for producing a stream of purge gas and means for connecting said stream of purge gas to said vessel to produce a flow of purge gas displacing reactant gas from said adsorbent and for mixing said displaced reactant gas with said reactant gas containing and product gas depleted stream; means for recycling said reactant gas containing and product gas depleted stream and said displaced reactant gas into the product gas producing process; and means connecting said stream of purge gas to desorb said product gas from said adsorbent and to produce a gas stream containing said product gas, thereby regenerating said adsorbent for product gas adsorption, and control means for operating said apparatus to operate a method for the production of a gas stream containing a product gas comprising:

a) subjecting a stream of a reactant gas to a product gas producing process to form a reactant gas and product gas containing stream;

b) adsorbing said product gas from said reactant gas and product gas rich stream in a bed of adsorbent so as to produce a reactant gas containing and product gas depleted stream;

c) displacing reactant gas from said bed by passing through the bed a stream of purge gas;

d) recycling said reactant gas containing and product gas depleted stream and said displaced reactant gas into the product gas producing process;

e) removing the product gas from said bed in a flow of said purge gas to produce said gas stream containing a product gas, thereby regenerating said adsorbent for product gas adsorption; and repeating steps (b) to (e) in a cyclic manner.

BRIEF DESCRIPTION OF THE SEVERAL VIEWS OF THE DRAWINGS

The invention will be further described and illustrated with reference to the accompanying drawings in which:

FIG. 3 is a table indicating the activity taking place in each bed of the apparatus shown in FIG. 1 at each stage of operation shown in FIG. 2.

DETAILED DESCRIPTION OF THE INVENTION

Figure 1:
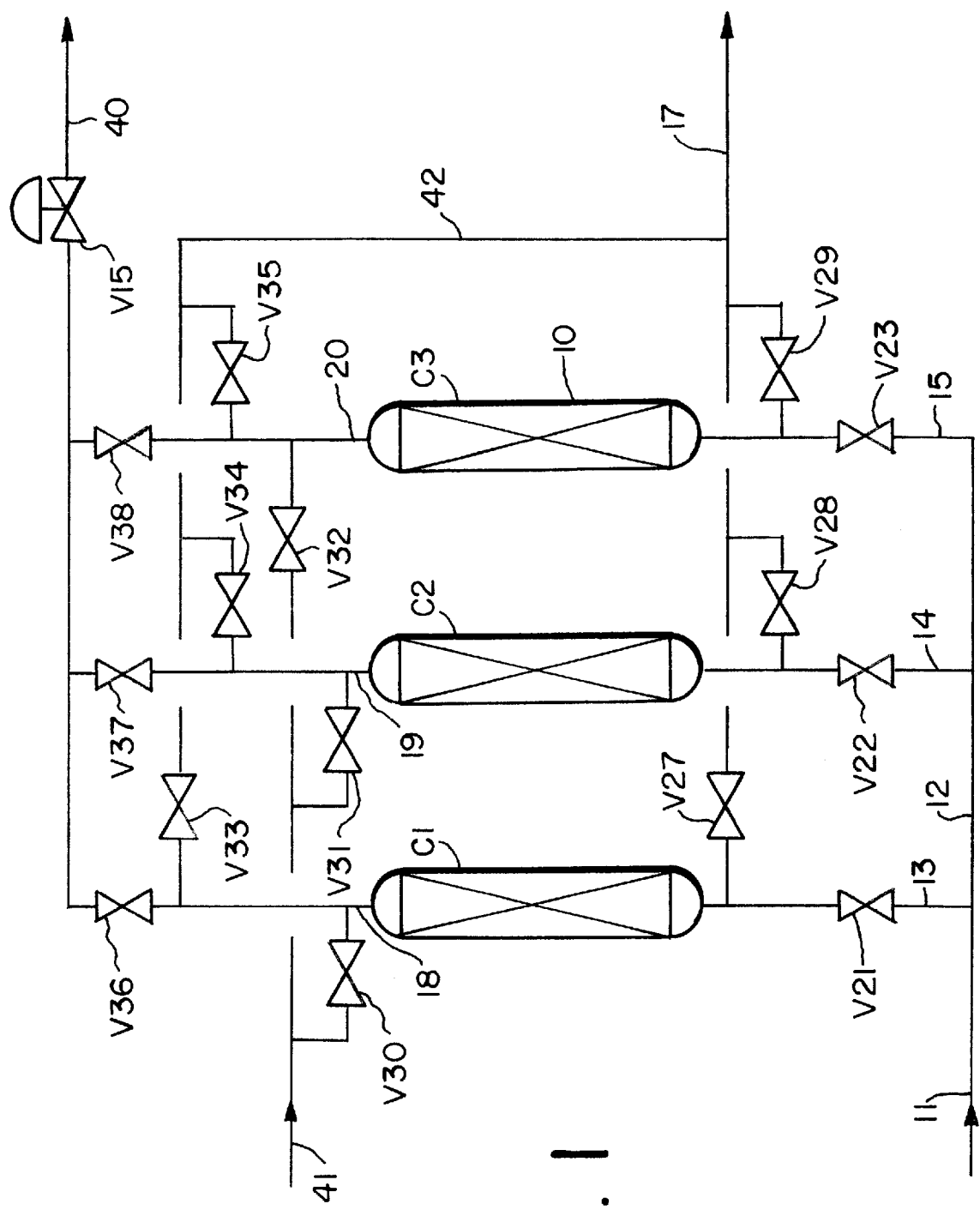
FIG. 1 is an illustration of apparatus for use in the invention.

As shown in FIG. 1, apparatus for use in accordance with the invention in connection with the production of an ozone containing stream comprises three columns C1, C2 and C3 each containing a similar bed of adsorbent 10. The adsorbent compromises a zeolite prepared in accordance with the teaching of EP0767002.

A feed of oxygen containing ozone is supplied through an inlet line 11 at a temperature close to ambient to a manifold 12 provided with three outlets in parallel controlled by valves V21, V22 and V23. Downstream of valves V21, V22 and V23, each of the respective outlets 13, 14, 15 from the manifold 12 is connected to purge gas with ozone outlet line 17 by respective control valves V27, V28 and V29. Each of the manifold outlets 13, 14 and 15 is then connected to an inlet of a respective one of the columns C1, C2 and C3. Each column C1, C2 and C3 has an outlet line 18, 19 and 20 respectively connecting through valves described below to an outlet line 40 for ozone depleted oxygen to be lo recycled.

Immediately above the columns C1, C2 and C3, each of the outlet lines 18, 19 and 20 is provided with a connection to a clean purge gas inlet line 41 controlled by a respective control valve V30, V31 and V32. Further downstream in the oxygen flow direction from there, each of the outlet lines 18, 19 and 20 has a connection to the ozone depleted oxygen outlet line 40 at a respective control valve V36, V37 and V38. Each is also connected to the purge outlet line 17 via a by-pass line 42 and via a respective control valve V33, V34 and V35. The operation of the valves in the required sequence may be automated by provision of a suitably connected control apparatus.

Figure 2:
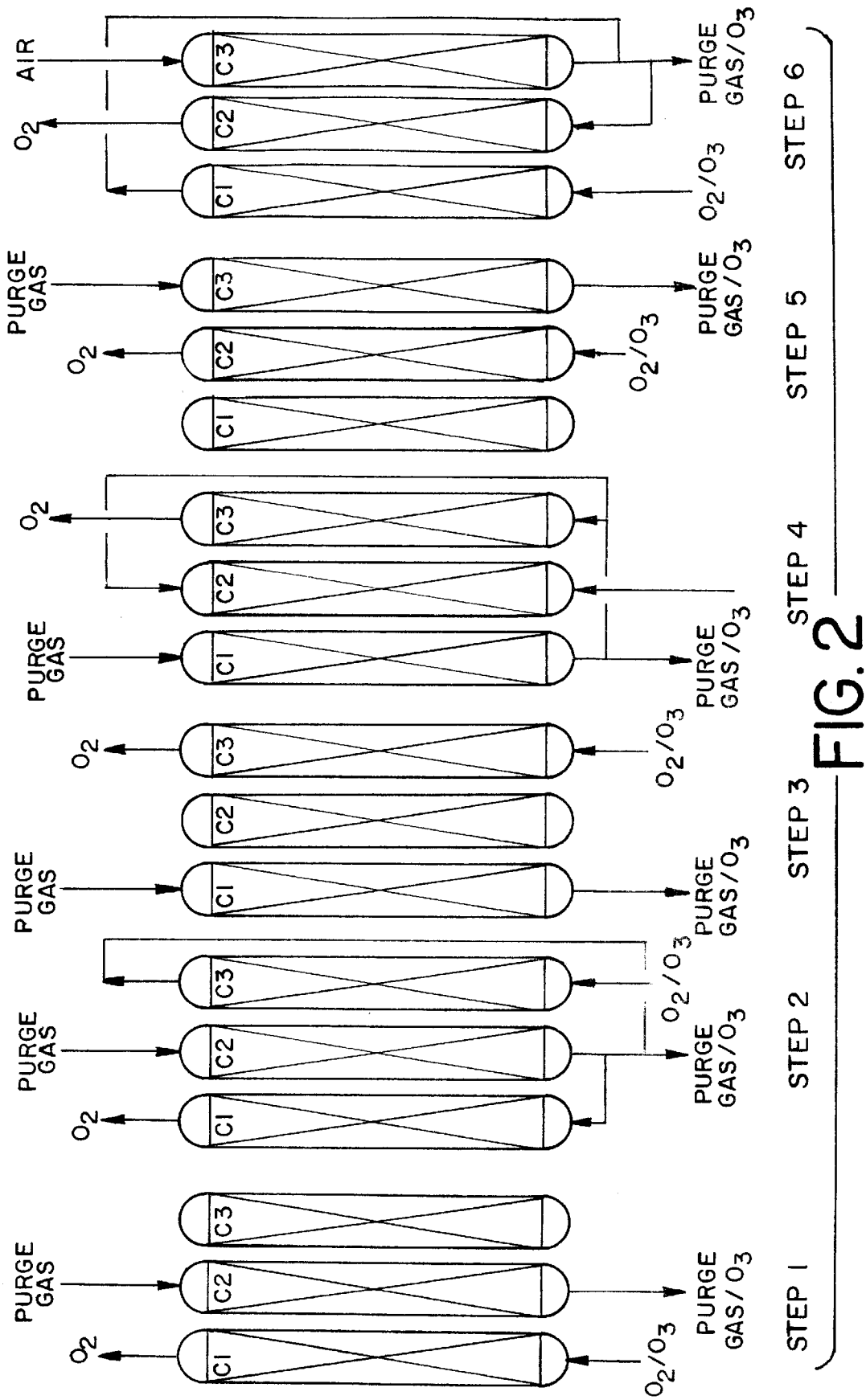
FIG. 2 is a schematic illustration of FIG. 1 in six stages of operation.

The use of the apparatus is illustrated in FIG. 2. As shown in FIG. 2, the apparatus of FIG. 1 is seen in six stages of operation constituting a cycle. In stage 1, a mixture of oxygen and ozone coming from an ozone generator is supplied to column C1 from line 11 via valve V21 to adsorb ozone with oxygen passing to line 40 via valves V36 and V15 whilst column C2 is subjected to a counter-current purging flow of dry nitrogen-rich gas, in this instance air from line 41 via valve V31, to desorb ozone from the adsorbent and to produce an ozone containing stream for consumption in line 17 via valve V28. Bed C3 is off-line. In stage 2, bed C3 is brought on-line by opening V23 to admit the mixture of oxygen and ozone to C3, and V21 is closed. Gas passes out of the top of column C3 to outlet line 20. Since at this stage C3 contains some residual air as purge gas, the outlet from C3 is routed via valve V35 to the ozone containing purge gas line 17 using line 42.

Column C2 is still undergoing purging of ozone by air but valve V27 is now opened to allow a portion of the output of column C2 to enter column C1 from below co-current with the previous flow of oxygen and ozone so as to displace oxygen from the void volume of column C1 through the outlet line 18 and through V36 and V15. V15 allows the flow rate to be controlled. Before air emerges from the top of C1, the cycle moves on to stage 3 as illustrated. Column C2 is taken off-line by closing the valves communicating with both the top and the bottom of column C2 (V22, V28 and V31, V34 and V37). The flow of purging gas is connected to the top of column C1 by opening V30 and is allowed to pass through column C1 into line 17 through valve V27. The feeding of oxygen and ozone to the bottom of column C3 continues but the outlet of column C3 is now redirected to outlet line 40 through valve V38 and flow control valve V15 with the closure of valve V35.

Stage 4 resembles stage 2 except that column C1 is being regenerated by the purge gas rather than column C2 and purge gas is being fed to the bottom of column C3 rather than the bottom of column C1 to displace oxygen from column C3 into the line 40 whilst oxygen and ozone are supplied to the base of column C2 to displace residual purge gas therefrom rather than to column C3.

Stage 5 resembles stages 1 and 3 with column C2 on-line to adsorb ozone, column C1 off-line and column C3 being purged of ozone by the purge gas. It is also possible to carry out the same process steps within the cycle without line 42. In this case lines 18, 19, 20 and valves V30, V31, V32 are employed to direct gas previously directed to the line 42 to the product header 17 via the bed undergoing nitrogen purging.

In this case, this bed has both its nitrogen purging flow and this extra flow passing through it.

Stage 6 resembles stages 2 and 4 but with column C1 now going back on-line to receive the oxygen and ozone feed and with purge gas being fed from the bottom of column C3 to the bottom of column C2 to displace oxygen into the line 40.

These six stages are summarised for each column in FIG. 3 where each horizontal row represents one of the columns C1, C2 and C3 and each vertical column represents one of the stages 1–6 illustrated in FIG. 2.

For the purposes of exemplification, one suitable flowrate regime for such a process will be described. The illustrated columns take the form of 3 vessels each of 50 mm ID and 1500 mm tall, each containing 2.60 kg of ozone adsorbing material. An oxygen feed of 1.63 kg/hr is feed into an ozone generator to produce an output containing 8.7 wt % ozone. Generally, the proportion of ozone will be in the range of 4 to 14%. For 420 seconds, one of the vessels C1 to C3 is fed with the oxygen/ozone mixture at about 2 bar so that substantially all the ozone is adsorbed while a second is purged with air at 2 bar at a rate of 1.98 kg/hr from top to bottom counter-currently removing a previously adsorbed ozone gas to the product stream while the third vessel is off-line in a hold step. The step time is 420 seconds. The purge pressure will generally be equal to the oxygen feed pressure save for any pressure drop needed to achieve the required flow rate. The purge gas is dried to a dew point below −40° C. to prevent nitric acid formation in the ozoniser.

The valves are now switched to allow the third vessel previously on hold to take the 1.63 kg/hr feed from the ozone generator for 95 seconds. This timing is set to allow for the bed to be cleaned of purge gas with a minimum loss of oxygen product from the top of the third vessel. The vented purge gas from the top of the third bed is redirected to the manifold of the valves connected at the bottom of the bed and is used to co-currently remove oxygen from the first column. The flow is restricted at the top of the first column by V15 to allow only 0.81 kg/hr of oxygen to be recycled to the ozone regenerator. This ensures that the maximum amount of oxygen is recovered in the 95 second step time from the first column without breakthrough of purge gas leading to contamination of recycle gas to the ozone generator.

The remainder of the flow of vented purge gas from the top of the third bed (i.e. 0.82 kg/hr) is added to the exiting purge gas from the second vessel, causing a reduction in the product ozone concentration. If higher ozone concentrations in the product purge gas for this step were advantageous, this balance of gas could be directed away from the product stream and vented. Correct sizing of the beds ensures that there is no ozone in this stream. The position of the valves around the second column remains unaltered with counter-current air purge continuing in a manner identical to that in the first step. Thus, the total product ozone flow from this step is 2.80 kg/hr. After this step has occurred, the process is repeated for all beds resulting in a total cycle time of 1545 seconds (3×(420+95)).

The operation of the apparatus in the manner described results in an ozone recovery of at least 98 percent as defined as ozone contained in the product gas divided by ozone contained in the gas stream exiting the ozone generator. The oxygen recovery defined as oxygen contained in the recycle line to the generator feed divided by unconverted oxygen in the generator exit is 93 percent. Although we have described in this example using air as the purge gas, similar results can be obtained using other inert gases e.g. nitrogen, although in this case oxygen recovery will be a little lower. The cycle described above operates advantageously at atmospheric temperature resulting in no risk of unsafe high concentrations or quantities of ozone building up on the adsorbent and in the vessel voids and piping. However, such a cycle can in principle also be operated at sub-atmospheric temperatures.

The adsorbent used according to the invention may be any of those previously proposed or otherwise for suitable for use in adsorbing ozone or the product gas generally. For ozone adsorption, known adsorbents include silica gel and zeolites. The use of HZSM-5 or similar zeolite is preferred.

In particular, the adsorbent may be as described in EP 0767002.

Whilst the invention has been described with reference to the illustrated embodiment, many modifications and variations thereof are possible within the scope of the invention to achieve similar high recoveries of oxygen and ozone using the displacement of oxygen rich gas by purge gas, and displacement of purge gas by oxygen rich gas.

We claim:

1. A method for the production of a gas stream containing a product gas comprising:
   a) subjecting a stream of a reactant gas to a product gas producing process to form a reactant gas and product gas containing stream;
   b) adsorbing said product gas from said reactant gas and product gas containing stream in a bed of adsorbent so as to produce a reactant gas containing and product gas depleted stream;
   c) displacing reactant gas from said bed by passing through the bed a stream of purge gas;
   d) recycling said reactant gas containing and product gas depleted stream and said displaced reactant gas into the product gas producing process;
   e) removing the product gas from said bed in a flow of said purge gas to produce said gas stream containing a product gas, thereby regenerating said adsorbent for product gas adsorption; and
   repeating steps (b) to (e) in a cyclic manner.

2. A method as claimed in claim 1, wherein a further step (f) is included and is repeated in which purge gas left in said bed following step (e) is removed from said bed and is not passed into the product gas producing process.

3. A method as claimed in claim 2, wherein said purge gas removed from the bed in step (f) is added to said gas stream containing a product gas.

4. A method as claimed in claim 2, wherein in step (f) said purge gas is removed from said bed by the passage into the bed of said reactant gas and product gas containing stream at the start of step (b).

5. A method as claimed in claim 1, wherein said reactant gas is oxygen.

6. A method as claimed in claim 1, wherein said product gas is ozone.

7. A method as claimed in claim 1, wherein said purge gas is a nitrogen rich gas.

8. A method for the production of a gas stream containing ozone comprising:
   a) subjecting a stream of oxygen containing gas to an ozone producing process to form an oxygen and ozone containing stream;
   b) adsorbing ozone from said oxygen and ozone containing stream in a bed of adsorbent so as to produce an oxygen containing ozone depleted stream;

c) displacing oxygen from said bed by passing through the bed a stream of nitrogen rich gas;

d) recycling said oxygen containing ozone depleted stream and said displaced oxygen into the ozone producing process;

e) removing ozone from said bed in a flow of nitrogen rich gas to produce said gas stream containing ozone, thereby regenerating said adsorbent for ozone adsorption and leaving said bed occupied by nitrogen rich gas;

f) removing nitrogen left in said bed following step (e) such that said nitrogen removed from said bed is not passed into said ozone generating process; and g) repeating steps (b) to (f) in a cyclic manner.

9. A method as claimed in claim 8, wherein said nitrogen removed from the bed in step (f) is added to said gas stream containing ozone.

10. A method as claimed in claim 8, wherein in step (f) said nitrogen is removed from said bed by the passage into the bed of said oxygen and ozone containing gas at the start of step (b).

11. A method as claimed in claim 8, wherein the flow of nitrogen rich gas in step (c) is in the same direction through the bed as the flow of oxygen and ozone containing gas stream in step (b) and the flow of nitrogen rich gas removing ozone from the bed in step (e) is in the opposite direction.

12. A method as claimed in claim 8, wherein at least two beds are subjected to said cyclic steps such that at least one bed is undergoing step (b) at any time.

13. A method as claimed in claim 12, wherein there are three beds or a multiple of three beds.

14. A method as claimed in claim 12, wherein between step (e) and step (b) each bed undergoes a period when it is off-line.

* * * * *

UNITED STATES PATENT AND TRADEMARK OFFICE
CERTIFICATE OF CORRECTION

PATENT NO. : 6,030,598
DATED : Feb. 29, 2000
INVENTOR(S) : Topham et al.

It is certified that error appears in the above-identified patent and that said Letters Patent is hereby corrected as shown below:

On the Title page, Item [30] Foreign Application Priority Data

Delete "[DE] Germany" and substitute therefore --[GB] Great Britain --

Signed and Sealed this

Twelfth Day of December, 2000

*Attest:*

Q. TODD DICKINSON

*Attesting Officer*                *Director of Patents and Trademarks*